(12) United States Patent
Tanaka

(10) Patent No.: US 9,874,866 B2
(45) Date of Patent: Jan. 23, 2018

(54) CONTROL SYSTEM INCLUDING CONTROL APPARATUS FOR CONTROLLING MACHINE HAVING A PLURALITY OF AXES

(71) Applicant: FANUC Corporation, Yamanashi (JP)

(72) Inventor: Takahiro Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 236 days.

(21) Appl. No.: 14/794,140

(22) Filed: Jul. 8, 2015

(65) Prior Publication Data

US 2016/0011580 A1  Jan. 14, 2016

(30) Foreign Application Priority Data

Jul. 9, 2014 (JP) .................................. 2014-141571

(51) Int. Cl.
  *G05B 19/41* (2006.01)
  *G05B 19/414* (2006.01)
(52) U.S. Cl.
  CPC ............ *G05B 19/4141* (2013.01); *G05B 2219/34015* (2013.01); *Y02P 90/087* (2015.11); *Y02P 90/10* (2015.11)
(58) Field of Classification Search
  None
  See application file for complete search history.

(56) References Cited

U.S. PATENT DOCUMENTS

| 5,420,485 A | 5/1995 | Campbell, Jr. |
| 5,990,638 A * | 11/1999 | Aoyama ............ G05B 19/4141 318/562 |
| 6,147,469 A * | 11/2000 | Uchida ................ G05B 19/414 318/16 |
| 6,791,294 B1 * | 9/2004 | Kazama ................. G05B 19/19 318/113 |
| 2002/0093303 A1 | 7/2002 | Lo |
| 2010/0125343 A1 * | 5/2010 | Hung ..................... G08C 19/00 700/3 |
| 2010/0231157 A1 * | 9/2010 | Haga ................... G05B 19/4093 318/570 |

FOREIGN PATENT DOCUMENTS

| CN | 101546185 A | 9/2009 |
| CN | 101916098 A | 12/2010 |
| CN | 103019169 A | 4/2013 |

(Continued)

*Primary Examiner* — Jason Lin
(74) *Attorney, Agent, or Firm* — Hauptman Ham, LLP

(57) ABSTRACT

A control system includes a control apparatus, identification information storage units disposed in a plurality of servo amplifiers and configured to store identification information pieces for identifying each of the plurality of servo amplifiers, communication units configured to perform communication between the control apparatus and the plurality of servo amplifiers, and an automatic setting unit configured to automatically set axis configuration parameters for assigning correspondence relations between a plurality of control axes and axes of the plurality of servo amplifiers based on the identification information and a type of a servo amplifier corresponding to each of the plurality of control axes recognized by software of the control apparatus.

2 Claims, 6 Drawing Sheets

(56) References Cited

FOREIGN PATENT DOCUMENTS

| | | | |
|---|---|---|---|
| JP | 04060704 A | * | 2/1992 |
| JP | 09-062323 A | | 3/1997 |
| JP | 9-146619 A | | 6/1997 |
| JP | 2006-015420 A | | 1/2006 |
| JP | 2007-164398 A | | 6/2007 |
| JP | 2009-223648 A | | 10/2009 |
| JP | 2010-118036 A | | 5/2010 |
| WO | 2013/013522 A1 | | 1/2013 |

* cited by examiner

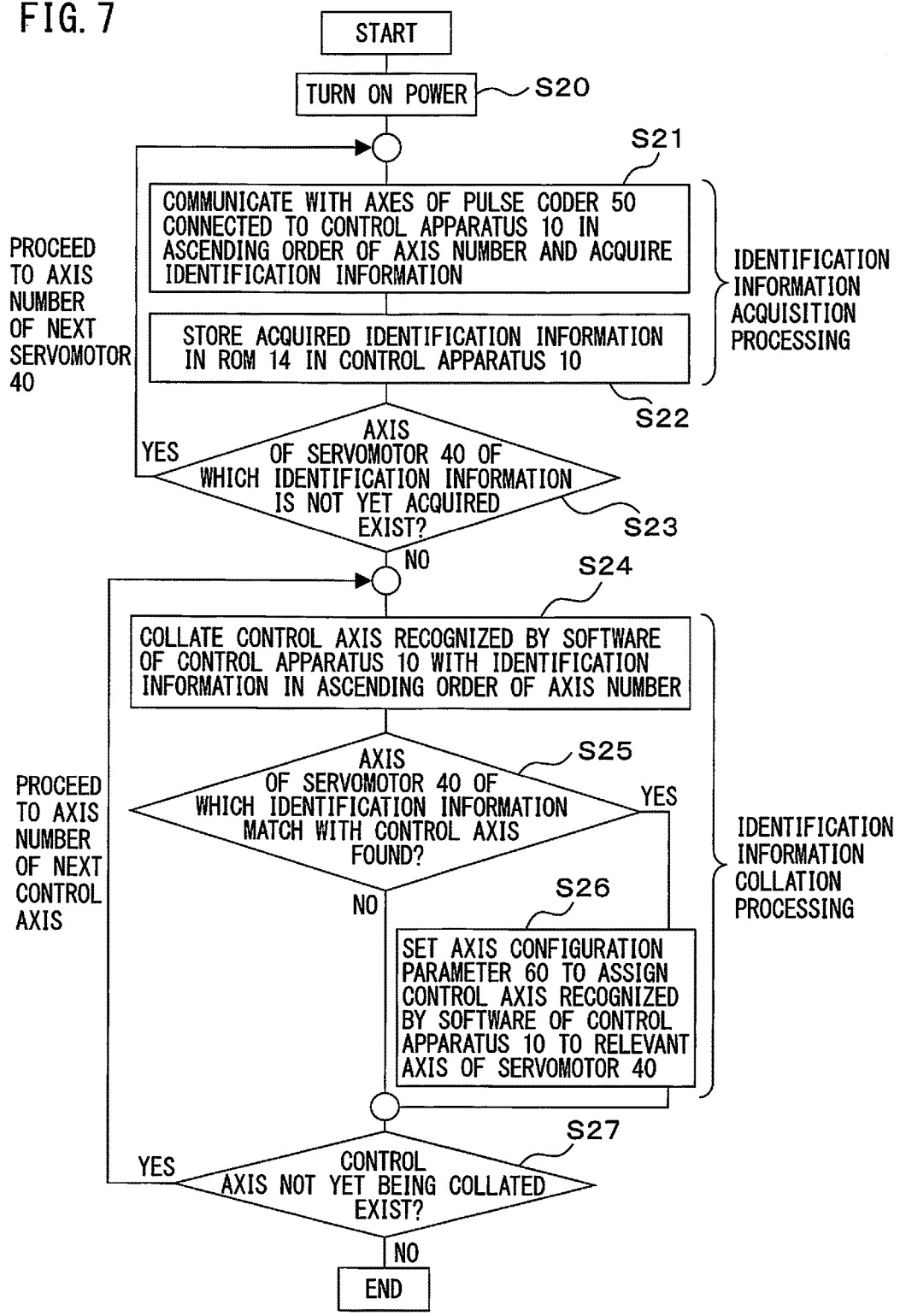

CONTROL SYSTEM INCLUDING CONTROL APPARATUS FOR CONTROLLING MACHINE HAVING A PLURALITY OF AXES

RELATED APPLICATIONS

The present application claims priority to Japanese Application Number 2014-141571, filed Jul. 9, 2014, the disclosure of which is hereby incorporated by reference herein in its entirety.

BACKGROUND OF THE INVENTION

1. Field of the Invention

The present invention relates to a control system including a control apparatus which controls a machine having a plurality of axes controlled by a plurality of servomotors, respectively.

2. Description of the Related Art

A control apparatus which controls a machine having a plurality of axes is connected to a plurality of servomotors via a servo control circuit and a plurality of servo amplifiers. The servomotors individually drive each of the plurality of axes of the machine.

The control apparatus associates an axis corresponding to a servomotor among the plurality of servomotors with a control axis recognized by software of the control apparatus and drives the axis. Thus, in order to drive each of the plurality of servomotors, it is necessary to correctly set axis configuration parameters in which correspondence relations between a plurality of control axes and the plurality of axes of the machine are assigned.

In the conventional technique, an operator manually sets axis configuration parameters. Therefore, it is necessary that an operator who starts up the control system correctly understands the correspondence relations between the plurality of control axes and the plurality of axes of the machine, and thus the operator has to have knowledge and experience. If an operator incorrectly sets the axis configuration parameters, there is a risk of operating a servomotor different from an intended servomotor.

In order to solve the above-mentioned issues, Japanese Laid-Open Patent Publication No. 9-62323 discloses a technique for automatically setting a system parameter necessary for axis control by reading specific information stored in a memory of a servo amplifier and/or a servomotor connected to a numerical control apparatus.

Japanese Laid-Open Patent Publication No. 2006-15420 discloses a robot control apparatus capable of easily changing an axis order in a robot main body and an axis order in a driving device. In this case, the robot control apparatus can handle an axis configuration in which a control axis number does not match with a connection order of the servo amplifier.

However, the technique according to Japanese Laid-Open Patent Publication No. 9-62323 is based on the assumption that correspondence relations between the control axis recognized by software and a plurality of axes of the servo amplifiers are correctly set in advance. Thus, if the correspondence relations are not correct, the technique according to Japanese Laid-Open Patent Publication No. 9-62323 cannot be applied.

According to Japanese Laid-Open Patent Publication No. 2006-15420, a setting value for changing the axes may be created in advance and read as array data. Thus, the technique according to Japanese Laid-Open Patent Publication No. 2006-15420 cannot automatically change the setting value for changing the axes.

The present invention has been made in view of the above-described circumstances, and it is an object of the present invention to provide a control system capable of automatically setting axis configuration parameters for assigning correspondence relations between control axes recognized by software and a plurality of axes of a machine.

SUMMARY OF THE INVENTION

According to a first aspect for accomplishing the above-described object of the present invention, a control system is provided which includes a control apparatus configured to control a machine including a plurality of axes driven by a plurality of servomotors, respectively, identification information storage units disposed in a plurality of servo amplifiers connected to the control apparatus and configured to store identification information pieces for identifying each of the plurality of servo amplifiers, communication units configured to perform communication between the control apparatus and the plurality of servo amplifiers, and an automatic setting unit configured to automatically set axis configuration parameters for assigning correspondence relations between the plurality of control axes and axes of the plurality of servo amplifiers based on the identification information pieces acquired from the identification information storage unit through the communication units and a type of a servo amplifier corresponding to each of the plurality of control axes recognized by software of the control apparatus.

According to a second aspect of the present invention, a control system is provided which includes a control apparatus configured to control a machine including a plurality of axes driven by a plurality of servomotors, respectively, identification information storage units disposed in each of the plurality of servomotors driven by a plurality of servo amplifiers connected to the control apparatus and configured to store identification information pieces for identifying each of the plurality of servomotors, communication units configured to perform communication between the control apparatus and the plurality of servo amplifiers and between the plurality of servo amplifiers and the plurality of servomotors, and an automatic setting unit configured to automatically set axis configuration parameters for assigning correspondence relations between the plurality of control axes and axes of the plurality of servomotors based on the identification information pieces acquired from the identification information storage unit through the communication units and a type of a servomotor corresponding to each of the plurality of control axes recognized by software of the control apparatus.

Additional objects, features, and advantages of the present invention will become apparent from the following detailed description of exemplary embodiments with reference to the attached drawings.

BRIEF DESCRIPTION OF THE DRAWINGS

FIG. 7 is a flowchart of identification information acquisition processing and identification information collation processing according to the second embodiment of the present invention.

DETAILED DESCRIPTION

Figure 1:
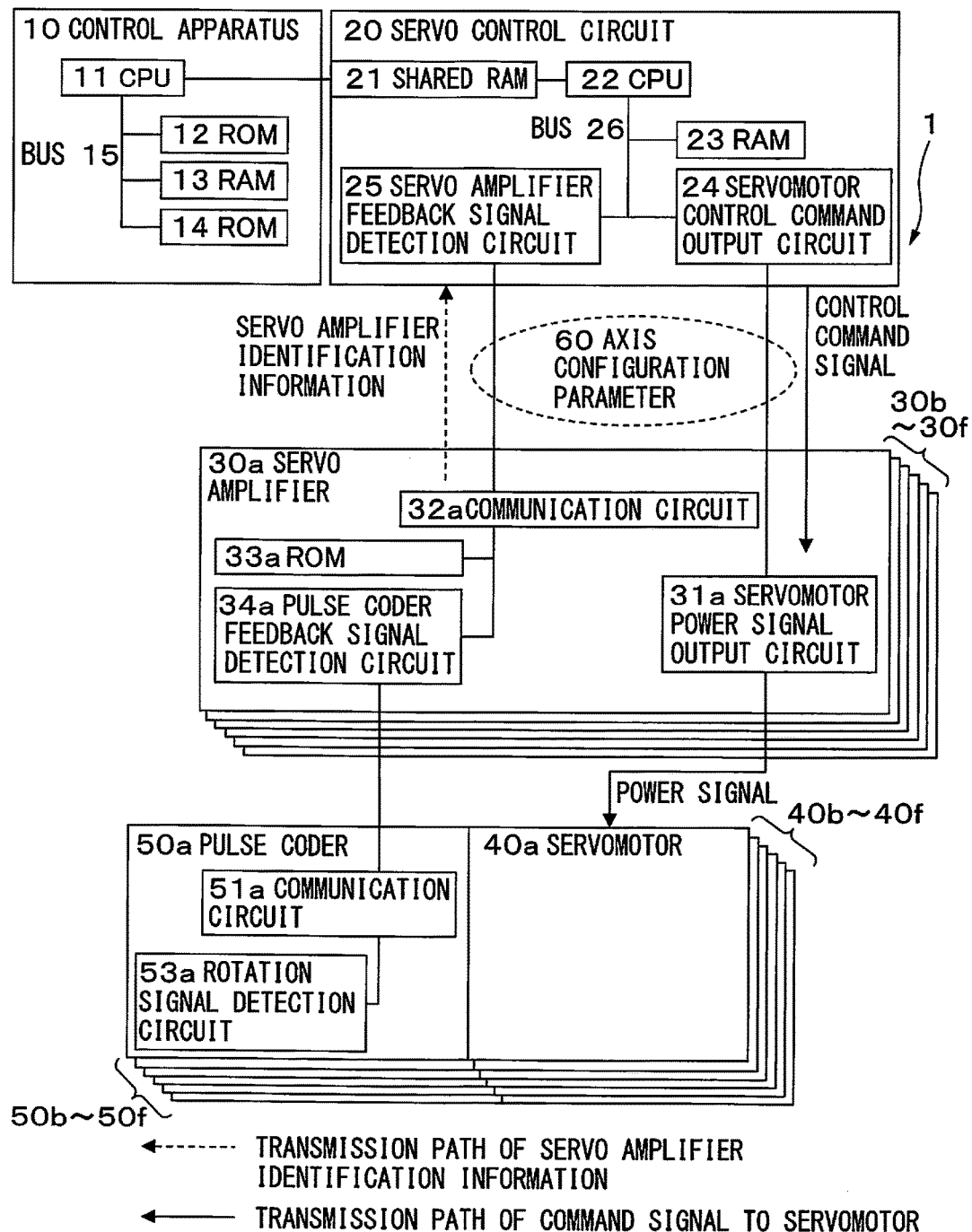
FIG. 1 is a block diagram of a main part of a control system including a control apparatus and a control system of a servomotor according to a first embodiment of the present invention.

Embodiments of the present invention will be described in detail below with reference to the attached drawings. Similar components are denoted by the same reference numerals in the drawings. The scales of the drawings have been appropriately changed to facilitate understanding of the present invention. The present invention is not limited to the embodiments described below.

First Embodiment

FIG. 1 is a block diagram of a main part of the control system including the control apparatus and the control system of the servomotor according to the first embodiment of the present invention. A control system 1 illustrated in FIG. 1 includes a control apparatus 10, a servo control circuit 20 connected to the control apparatus 10, a plurality of servo amplifiers 30*a* to 30*f* connected to the servo control circuit 20, a plurality of servomotors 40*a* to 40*f* respectively connected to the servo amplifiers 30*a* to 30*f*, and pulse coders 50*a* to 50*f* respectively included in the servomotors 40*a* to 40*f*.

The plurality of servomotors 40*a* to 40*f* operates in response to a power signal received from the servo amplifiers 30*a* to 30*f* described below. The plurality of servomotors 40*a* to 40*f* is used to drive any of a plurality of axes 1 to 6 of a machine (not illustrated). The machine is, for example, a machining tool or an industrial robot. In the specification of the present invention, such a machine is described below as including a six-axis configuration. However, the axis configuration of the machine may include other number of axes.

In the control apparatus 10 illustrated in FIG. 1, a read-only memory (ROM) 12 for storing a control program for controlling the control apparatus 10, a random access memory (RAM) 13 used for temporarily storing data, and a ROM 14 for storing identification information pieces and axis configuration parameters of the servo amplifiers 30*a* to 30*f* are each connected to a central processing unit (CPU) 11 by a bus 15. The control apparatus 10 transmits operation instructions for bringing the servomotors 40*a* to 40*f* into positions and speeds set in the control program to the servo control circuit 20 via a shared RAM 21. Both of the control apparatus 10 and the servo control circuit 20 can access the shared RAM 21. The control apparatus 10 and the servo control circuit 20 communicate with each other via the shared RAM 21.

In the servo control circuit 20 illustrated in FIG. 1, a RAM 23 for storing parameters necessary for controlling the servo amplifiers 30*a* to 30*f* and the servomotors 40*a* to 40*f*, a servomotor control instruction output circuit 24 for outputting instruction signals for controlling the servomotors 40*a* to 40*f* to the servo amplifiers 30*a* to 30*f*, and a servo amplifier feedback signal detection circuit 25 for receiving feedback signals transmitted from the servo amplifiers 30*a* to 30*f* are each connected to a CPU 22 by a bus 26. The servo control circuit 20 receives the operation instruction transmitted from the control apparatus 10 via the shared RAM 21 and outputs instruction signals to the servo amplifiers 30*a* to 30*f*.

The feedback signals transmitted from the servo amplifiers 30*a* to 30*f* include not only the identification information pieces stored by the servo amplifiers 30*a* to 30*f*, but also position/speed information pieces of the servomotors 40*a* to 40*f* detected by the pulse coders 50*a* to 50*f*, status information indicating abnormalities in the pulse coders 50*a* to 50*f*, and the like. All of the feedback signals are transmitted through the same signal line.

The servo amplifier 30*a* illustrated in FIG. 1 includes a servomotor power signal output circuit 31*a* for receiving an instruction signal transmitted from the servomotor control instruction output circuit 24 disposed in the servo control circuit 20 and outputting a power signal to the servomotor 40*a*, a pulse coder feedback signal detection circuit 34*a* for receiving a pulse coder feedback signal transmitted from the pulse coder 50*a*, a ROM 33*a* for storing the identification information of the servo amplifier 30*a*, and a communication circuit 32*a* for outputting the feedback signals from the pulse coder 50*a* and the servo amplifier 30*a* to the servo amplifier feedback signal detection circuit 25 in the servo control circuit 20. The other servo amplifiers 30*b* to 30*f* are supposed to basically include the similar configuration.

The feedback signals transmitted from the pulse coders 50*a* to 50*f* include the position/speed information pieces of the servomotors 40*a* to 40*f* detected by the pulse coders 50*a* to 50*f*, the status information indicating abnormalities in the pulse coders 50*a* to 50*f*, and the like. The feedback signals are all transmitted through the same signal line.

The pulse coder 50*a* illustrated in FIG. 1 is connected to the servomotor 40*a* and includes a rotation signal detection circuit 53*a* for detecting a position and a speed of the servomotor 40*a* and a communication circuit 51*a* for outputting the identification information of the servomotor 40*a* and the pulse coder feedback signal to the servo amplifier 30*a*. The other pulse coders 50*b* to 50*f* are supposed to basically include the similar configuration.

In FIG. 1, the identification information pieces of the servo amplifiers 30*a* to 30*f* are data pieces indicating types of the servo amplifiers 30*a* to 30*f*, such as the number of controllable axes and current capacity values of the servo amplifiers 30*a* to 30*f*. The identification information pieces are written and stored in the ROMs 33*a* to 33*f* of the servo amplifiers 30*a* to 30*f* at the time of factory shipment.

Figure 2:
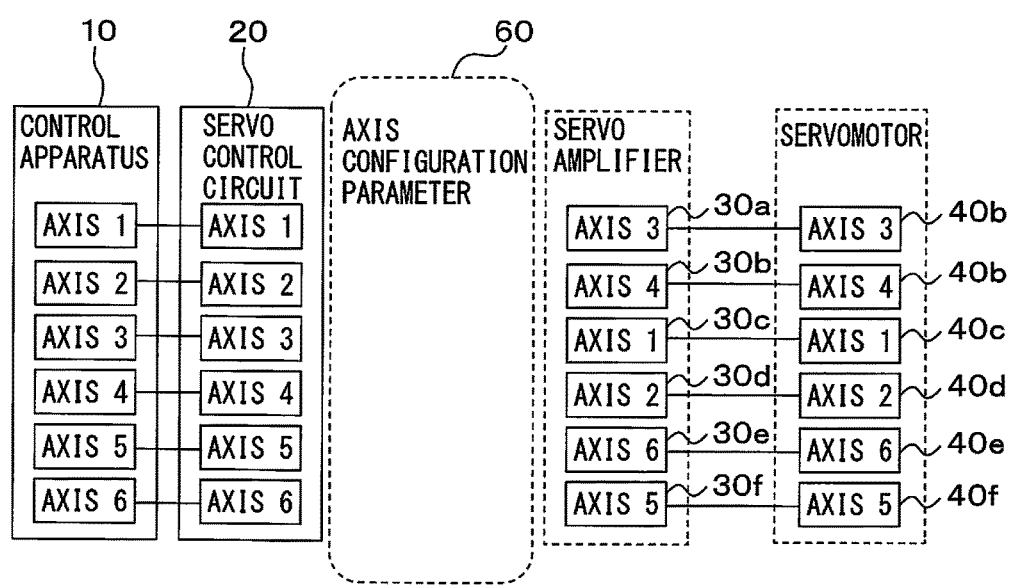
FIG. 2 is a block diagram illustrating an axis configuration of the control apparatus according to the first embodiment of the present invention.

FIG. 2 is a block diagram illustrating an axis configuration of the control apparatus according to the first embodiment of the present invention. In FIG. 2, an axis 1 to an axis 6 of the control apparatus 10 represent each of a plurality of control axes recognized by the software of the control apparatus 10. When the software is installed in the control apparatus 10, the axes 1 to 6 of the control apparatus 10 are determined to correspond to axes 1 to 6 of the servo control circuit 20 in ascending order of the axis number.

Further, in FIG. 2, correspondence relations between axes in the servo amplifiers 30*a* to 30*f* and axes in the servomotors 40a to 40f are each supposed to be determined in advance by wirings of hardware. Thus, as illustrated in FIG. 2, the axes 1 to 6 in the servo amplifiers 30a to 30f and those in the servomotors 40a to 40f are not necessarily arranged in numerical order of the axes.

Furthermore, in FIG. 2, an axis configuration parameter 60 for assigning the correspondence relation between each axis in the servo control circuit 20 and each axis in the servo amplifiers 30a to 30f is in an initial state and not set. Thus, in the state illustrated in FIG. 2, the servomotors 40a to 40f cannot be driven. Conventionally, an operator who starts up the control system has to manually set the axis configuration parameter 60.

Figure 3:
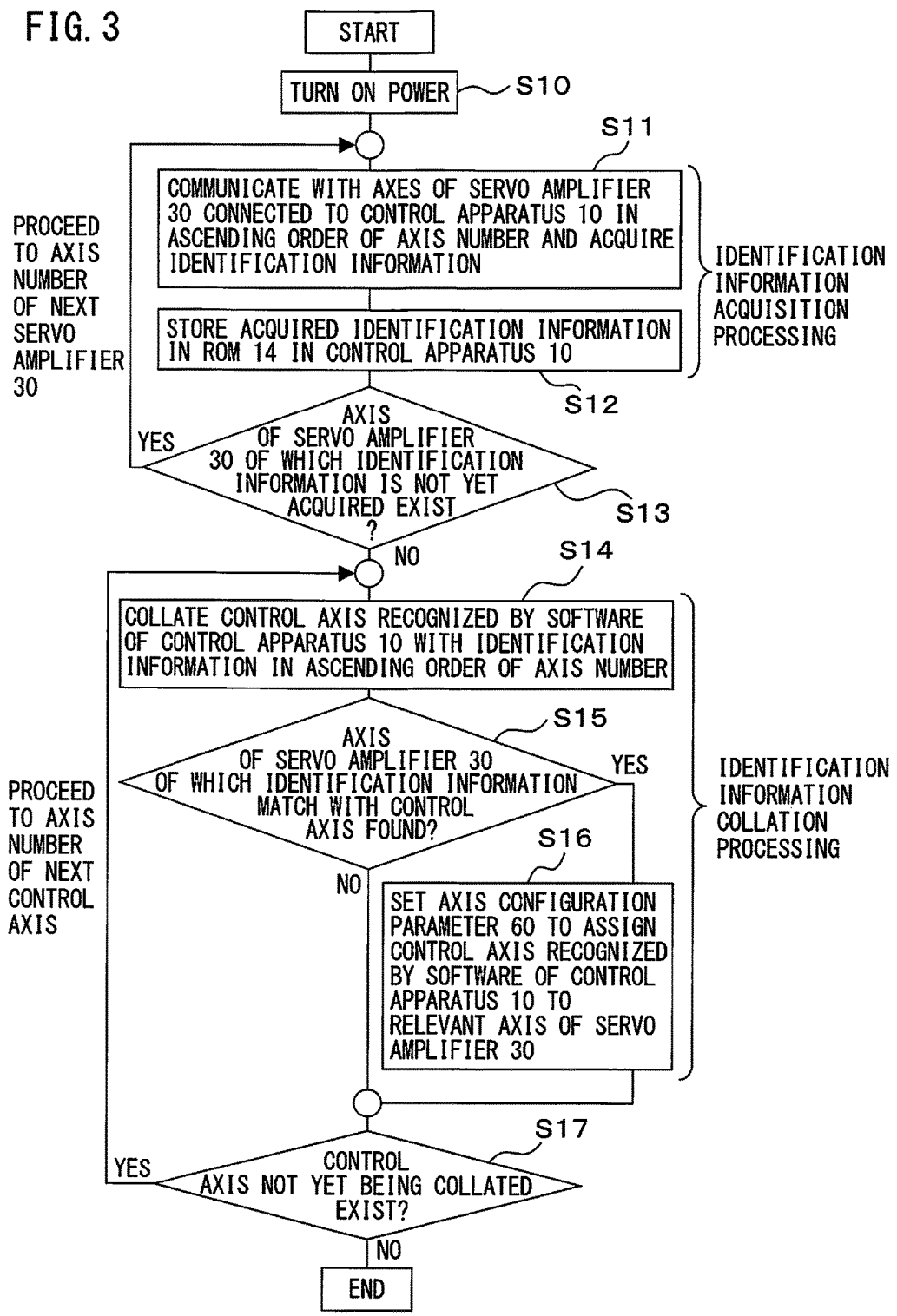
FIG. 3 is a flowchart of identification information acquisition processing and identification information collation processing according to the first embodiment of the present invention.

FIG. 3 is a flowchart of the identification information acquisition processing and the identification information collation processing according to the first embodiment of the present invention. In FIG. 3, the identification information pieces of the servo amplifiers 30a to 30f are used as identification information. The first embodiment of the present invention is described below with reference to the flowchart illustrated in FIG. 3.

First, in step S10, the control apparatus 10 is powered on. Next, in step S11, the control apparatus 10 communicates with all axes of the plurality of servo amplifiers 30a to 30f in ascending order of the axis number to read the identification information of each axis.

In other words, the control apparatus 10 accesses the ROMs 33a to 33f of the respective servo amplifiers 30a to 30f in series through the shared RAM 21 and the servo amplifier feedback signal detection circuit 25 of the servo control circuit 20 and communication circuits 32a to 32f of the servo amplifiers 30a to 30f. Then, the control apparatus 10 reads the identification information pieces stored in the ROMs 33a to 33f in series. The read identification information pieces are stored in the ROM 14 in the control apparatus 10 (in step S12).

Thus, according to the first embodiment, the shared RAM 21 and the servo amplifier feedback signal detection circuit 25 of the servo control circuit 20 and the communication circuits 32a to 32f of the servo amplifiers 30a to 30f serve as a communication unit. In FIG. 1, a transmission path of the identification information pieces of the servo amplifiers 30a to 30f is indicated by a broken line. The plurality of servo amplifiers 30a to 30f may be configured as single systems connected in series or as multiple systems connected in parallel.

Then, in step S13, it is determined whether there is an axis of the servo amplifier 30 of which identification information is not yet acquired. Then, the operations in steps S11 and S12 are repeated until the identification information pieces of all axes of the servo amplifier 30 are acquired. The processing in steps S11 to S13 is the identification information acquisition processing. When it is confirmed that the identification information pieces of all axes of the servo amplifier 30 are acquired, the processing proceeds to step S14.

In step S14, the control apparatus 10 collates the types of the servo amplifiers 30a to 30f to which each of the control axes are connected with the identification information pieces of the respective axes of the servo amplifiers 30a to 30f stored in the ROM 14. The collation is performed in ascending order of the axis number with respect to all of the control axes recognized by the software of the control apparatus 10. Type information pieces of the servo amplifiers 30a to 30f to which each of the control axes are connected are stored in the ROM 14 of the control apparatus 10 when the software is installed in the control apparatus 10.

Then, in step S15, if it is determined that an axis of the servo amplifier 30 is found of which identification information matches with the type information of the control axis recognized by the software of the control apparatus 10, the processing proceeds to step S16. In step S16, the CPU 11 of the control apparatus 10 automatically sets the axis configuration parameter 60 so as to assign the control axis recognized by the software of the control apparatus 10 to the relevant axis of the servo amplifier 30.

Figure 4:
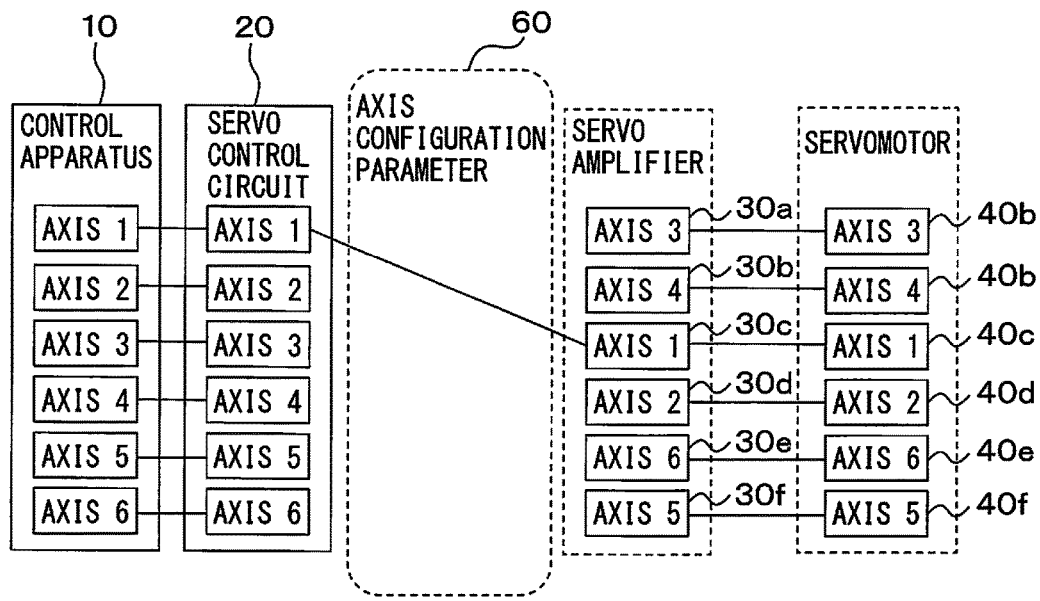
FIG. 4 is another block diagram illustrating an axis configuration of the control apparatus according to the first embodiment of the present invention.

FIG. 4 is another block diagram illustrating the axis configuration of the control apparatus according to the first embodiment of the present invention. In FIG. 4, the servo amplifiers 30a to 30f are searched for an axis of which identification information matches with each of the control axes recognized by the software of the control apparatus 10, and an axis 1 of the servo amplifier 30c is supposed to corresponds thereto as a result of search. In this case, as illustrated in FIG. 4, a correspondence relation is assigned so that the axis 1 of the control apparatus 10 corresponds one-to-one to the axis 1 of the servo amplifier 30c. FIG. 4 illustrates a state in which the axis configuration parameter 60 only for the axis 1 is automatically set normally. However, in FIG. 4, the processing for an axis 2 to an axis 6 are not yet performed.

With reference to FIG. 3 again, in step S17, it is determined whether there is the control axis which is not yet subjected to the collation, and if any control axis which is not yet subjected to the collation exists, the processing returns to step S14. In step S15, if it is determined that the axis of the servo amplifier 30 of which identification information matches with the control axis recognized by the control apparatus 10 is not found, the processing directly proceeds to step S17. The processing in steps S14 to S17 is the identification information collation processing.

Then, the processing in steps S14 to S17 is repeated until the collation is completed with respect to all control axes. When the collation and automatic setting of the axis configuration parameter 60 are completed with respect to all control axes, the processing is terminated.

Figure 5:
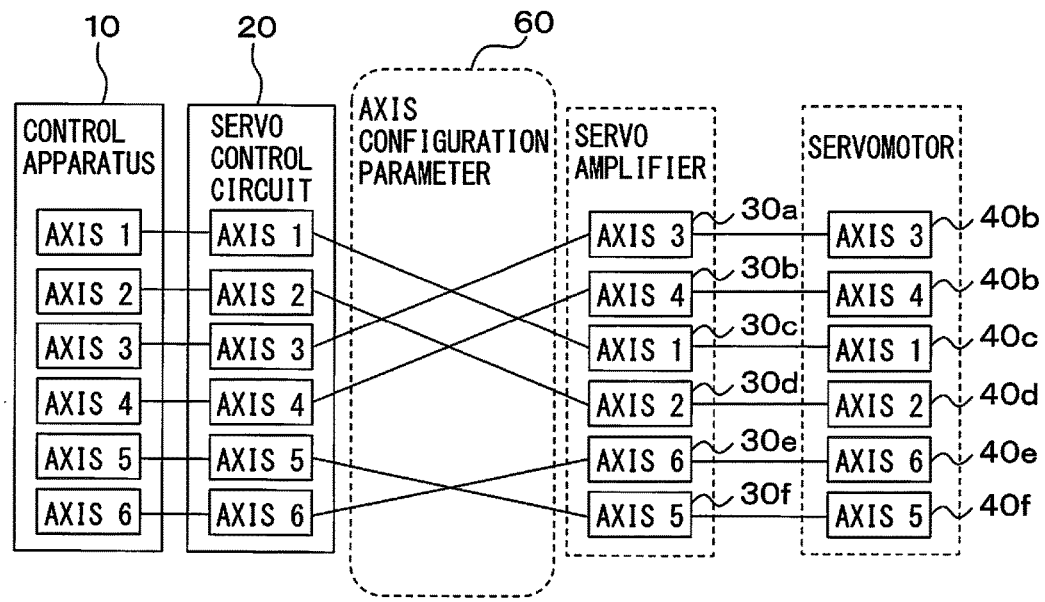
FIG. 5 is yet another block diagram illustrating an axis configuration of the control apparatus according to the first embodiment of the present invention.

FIG. 5 is yet another block diagram illustrating the axis configuration of the control apparatus according to the first embodiment of the present invention. FIG. 5 is an example illustrating a state in which the axis configuration parameters 60 are automatically set normally with respect to all axes.

In the example illustrated in FIG. 5, the axis 1 recognized by the software of the control apparatus 10 controls the axis of the servo amplifier 30c, and the axis 2 recognized by the software of the control apparatus 10 controls the axis of the servo amplifier 30d. Similarly, the axis 3 recognized by the software of the control apparatus 10 controls the axis of the servo amplifier 30a, the axis 4 recognized by the software of the control apparatus 10 controls the axis of the servo amplifier 30b, the axis 5 recognized by the software of the control apparatus 10 controls the axis of the servo amplifier 30f, and the axis 6 recognized by the software of the control apparatus 10 controls the axis of the servo amplifier 30e.

As described above, according to the present invention, the axis configuration parameters 60 can be automatically set which assign the correspondence relations between each of the control axes recognized by the software of the control apparatus 10 and each axis of the servo amplifiers 30a to 30f without manual operations by an operator.

When a machine controlled by the control apparatus 10 is a robot, a combination of identification information pieces of a plurality of axes of the servo amplifier can be collated as a single data set. For example, in the case of a six-axis robot, a combination of identification information pieces of six axes of the servo amplifier 30 may be collated as a data set, and the axis configuration parameter 60 may be automatically set to assign, to control axes of the six-axis robot, axes of the servo amplifier 30 of which identification information pieces of the six axes match with the data set.

Second Embodiment

In the above-described first embodiment, the identification information pieces of the servo amplifiers 30a to 30f are used. According to the second embodiment, identification information pieces of the servomotors 40a to 40f are used instead of the identification information pieces of the servo amplifiers 30a to 30f.

Figure 6:
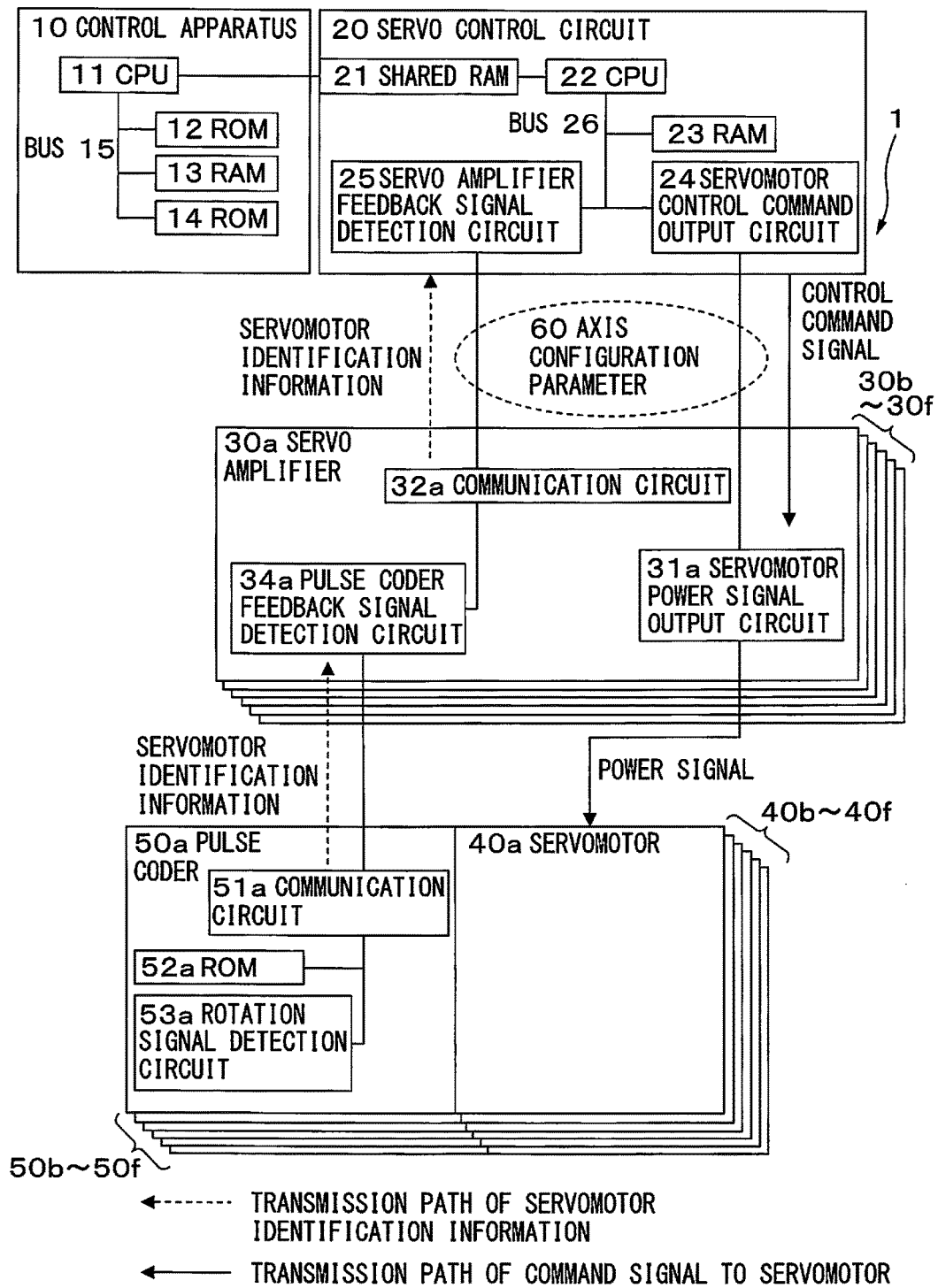
FIG. 6 is a block diagram of a main part of a control system including a control apparatus and a control system of a servomotor according to a second embodiment of the present invention.

FIG. 6 is a block diagram of a main part of the control system including the control apparatus and the control system of the servomotor according to the second embodiment of the present invention. The control system 1 illustrated in FIG. 6 also includes the control apparatus 10, the servo control circuit 20 connected to the control apparatus 10, a plurality of the servo amplifiers 30a to 30f connected to the servo control circuit 20, a plurality of the servomotors 40a to 40f respectively connected to the servo amplifiers 30a to 30f, and the pulse coders 50a to 50f respectively included in the servomotors 40a to 40f. The second embodiment of the present invention is described below with reference to FIG. 6. Descriptions of parts same as those in the first embodiment are omitted.

In the control apparatus 10 illustrated in FIG. 6, the ROM 12 for storing a control program for controlling the control apparatus 10, the RAM 13 used for temporarily storing data, and the ROM 14 for storing the identification information pieces and the axis configuration parameters of the servomotors 40a to 40f are each connected to the CPU 11 by the bus 15. The control apparatus 10 transmits operation instructions for bringing the servomotors 40a to 40f into positions and speeds set in the control program to the servo control circuit 20 via the shared RAM 21.

The feedback signals transmitted from the servo amplifiers 30a to 30f include not only the identification information pieces of the servomotors 40a to 40f stored in the pulse coders 50a to 50f, but also the position/speed information pieces of the servomotors 40a to 40f detected by the pulse coders 50a to 50f, the status information indicating abnormalities in the pulse coders 50a to 50f, and the like. The feedback signals are all transmitted through the same signal line.

The servo amplifier 30a illustrated in FIG. 6 includes the servomotor power signal output circuit 31a for receiving an instruction signal transmitted from the servomotor control instruction output circuit 24 disposed in the servo control circuit 20 and outputting a power signal to the servomotor 40a, the pulse coder feedback signal detection circuit 34a for receiving a pulse coder feedback signal transmitted from the pulse coder 50a, and the communication circuit 32a for outputting the feedback signals from the pulse coder 50a and the servo amplifier 30a to the servo amplifier feedback signal detection circuit 25 in the servo control circuit 20. The other servo amplifiers 30b to 30f should basically include a similar configuration.

The feedback signals transmitted from the pulse coders 50a to 50f include not only the identification information pieces of the servomotors 40a to 40f stored in the pulse coders 50a to 50f, but also the position/speed information pieces of the servomotors 40a to 40f detected by the pulse coders 50a to 50f, the status information indicating abnormalities in the pulse coders 50a to 50f, and the like. The feedback signals are all transmitted through the same signal line.

The pulse coder 50a illustrated in FIG. 6 is connected to the servomotor 40a and includes the rotation signal detection circuit 53a for detecting a position and a speed of the servomotor 40a, a ROM 52a for storing the identification information of the servomotor 40a, and the communication circuit 51a for outputting the pulse coder feedback signal to the servo amplifier 30a. The other pulse coders 50b to 50f are supposed to basically include the similar configuration.

In FIG. 6, the identification information pieces of the servomotors 40a to 40f are data pieces indicating types of the servomotors 40a to 40f, such as rated current values thereof. The identification information pieces are supposed to be written into the ROMs 52a to 52f of the pulse coders 50a to 50f at the time of factory shipment.

FIG. 7 is a flowchart of the identification information acquisition processing and the identification information collation processing according to the second embodiment of the present invention. In FIG. 7, the identification information pieces of the servomotors 40a to 40f are used as identification information. The second embodiment of the present invention is described below with reference to the flowchart illustrated in FIG. 7.

First, in step S20, the control apparatus 10 is powered on. Next, in step S21, the control apparatus 10 communicates with all axes of the plurality of pulse coders 50a to 50f in ascending order of the axis number to read the identification information each of the axes.

In other words, the control apparatus 10 accesses the ROMs 52a to 52f of the respective pulse coders 50a to 50f in series through the shared RAM 21 and the servo amplifier feedback signal detection circuit 25 of the servo control circuit 20, the communication circuits 32a to 32f and the pulse coder feedback signal detection circuits 34a to 34f of the servo amplifiers 30a to 30f, and the communication circuits 51a to 51f of the pulse coders 50a to 50f. Then, the control apparatus 10 reads the identification information pieces stored in the ROMs 52a to 52f in series. The read identification information pieces are stored in the ROM 14 in the control apparatus 10 (in step S22).

Thus, according to the second embodiment, the shared RAM 21 and the servo amplifier feedback signal detection circuit 25 of the servo control circuit 20, the communication circuits 32a to 32f and the pulse coder feedback signal detection circuits 34a to 34f of the servo amplifiers 30a to 30f, and the communication circuits 51a to 51f of the pulse coders 50a to 50f serve as a communication unit. In FIG. 6, transmission paths of the identification information pieces of the servomotors 40a to 40f are indicated by broken lines.

Then, in step S23, it is determined whether there is an axis of the servomotor 40 of which identification information is not yet acquired. Then, the operations in steps S21 and S22 are repeated until the identification information pieces of all axes of the servomotor 40 are acquired. The processing in steps S21 to S23 is the identification information acquisition processing. When it is confirmed that the identification information pieces of all axes of the servomotor 40 are acquired, the processing proceeds to step S24.

In step S24, the types of the servomotors 40a to 40f to which each of the control axes are connected are collated with the identification information pieces of the respective axes of the servomotors 40a to 40f stored in the ROM 14. The collation is performed in ascending order of the axis number with respect to all of the control axes recognized by the software of the control apparatus 10. Type information pieces of the servomotors 40*a* to 40*f* to which each of the control axes are connected are supposed to be stored in the ROM 14 of the control apparatus 10 when the software is installed in the control apparatus 10.

Then, in step S25, if it is determined that an axis of the servomotor 40 is found of which identification information matches with the type information of the control axis recognized by the software of the control apparatus 10, the processing proceeds to step S26. In step S26, the CPU 11 of the control apparatus 10 automatically sets the axis configuration parameter 60 so as to assign the control axis recognized by the software of the control apparatus 10 to the relevant axis of the servomotor 40 (see FIG. 4).

Then, in step S27, it is determined whether there is the control axis which is not yet subjected to the collation, and if any control axis which is not yet subjected to the collation exists, the processing returns to step S24. In step S25, if it is determined that the axis of the servomotor 40 of which identification information matches with the control axis recognized by the control apparatus 10 is not found, the processing directly proceeds to step S27. The processing in steps S24 to S27 is the identification information collation processing.

Then, the processing in steps S24 to S27 is repeated until the collation is completed with respect to all control axes. When the collation and automatic setting of the axis configuration parameter 60 are completed with respect to all control axes, the processing is terminated (see FIG. 5).

As described above, when the identification information pieces of the servomotors 40*a* to 40*f* are used, the axis configuration parameters 60 can be automatically set which assign the correspondence relations between each of the control axes recognized by the software of the control apparatus 10 and each axis of the servomotors 40*a* to 40*f* without manual intervention by an operator. According to the first embodiment and the second embodiment, the software of the control apparatus 10 may regularly acquire the identification information pieces of the servo amplifiers 30*a* to 30*f* or the servomotors 40*a* to 40*f* even after automatically setting the axis configuration parameters 60. Further, it is checked whether the axis configuration of the control axes recognized by the software of the control apparatus 10 and the axis configuration of the servo amplifiers 30*a* to 30*f* or the servomotors 40*a* to 40*f* are not changed. When the axis configuration is changed, all steps in the flowchart illustrated in FIG. 3 or FIG. 7 are executed. Accordingly, the axis configuration parameters 60 can be automatically set again.

As described above, according to the present invention, the axis configuration parameters 60 which assign the correspondence relations between each control axis recognized by the software of the control apparatus 10 and each axis of the servo amplifiers 30*a* to 30*f* or the servomotors 40*a* to 40*f* can be automatically set. Accordingly, prevention of an incorrect setting by an operator, simplification of a start-up operation, and shortening of a start-up time can be realized.

EFFECT OF THE INVENTION

According to the first aspect of the present invention, axis configuration parameters between a plurality of control axes recognized by software of a control apparatus and axes of a plurality of servo amplifiers can be automatically set. Accordingly, the first aspect of the present invention can realize prevention of an incorrect setting by an operator, simplification of a start-up operation, and shortening of a start-up time.

According to the second aspect of the present invention, axis configuration parameters between a plurality of control axes recognized by software of a control apparatus and axes of a plurality of servomotors driven by a plurality of servo amplifiers can be automatically set. Accordingly, prevention of an incorrect setting by an operator, simplification of a start-up operation, and shortening of a start-up time can be realized.

The present invention has been described above using the exemplary embodiments; however, various modifications, omission, and addition of the embodiments will be apparent to those skilled in the art to which the present invention belongs without departing from the scope and spirit of the present invention.

What is claimed is:

1. A control system, comprising:
   a control apparatus configured to control a machine including a plurality of axes driven by a plurality of servomotors, respectively;
   identification information storage units disposed in a plurality of servo amplifiers connected to the control apparatus, the identification information storage units configured to store identification information pieces for identifying each of the plurality of servo amplifiers;
   communication units configured to perform communication between the control apparatus and the plurality of servo amplifiers; and
   an automatic setting unit configured to automatically set axis configuration parameters to assign correspondence relations between (i) a plurality of control axes recognized by software of the control apparatus and (ii) axes of the plurality of servo amplifiers based on the identification information pieces acquired from the identification information storage unit through the communication units; and a type of a servo amplifier corresponding to each of the plurality of control axes recognized by the software of the control apparatus,
   wherein the machine is controlled based on the automatically set axis configuration parameters.

2. A control system, comprising:
   a control apparatus configured to control a machine including a plurality of axes driven by a plurality of servomotors, respectively;
   identification information storage units disposed in the plurality of servomotors driven by a plurality of servo amplifiers connected to the control apparatus, the identification information storage units configured to store identification information pieces for identifying each of the plurality of servomotors;
   communication units configured to perform communication between the control apparatus and the plurality of servo amplifiers and between the plurality of servo amplifiers and the plurality of servomotors; and
   an automatic setting unit configured to automatically set axis configuration parameters to assign correspondence relations between (i) a plurality of control axes recognized by software of the control apparatus and (ii) axes of the plurality of servomotors based on the identification information pieces acquired from the identification information storage unit through the communication units, and a type of a servomotor corresponding to each of the plurality of control axes recognized by the software of the control apparatus,
   wherein the machine is controlled based on the automatically set axis configuration parameters.

\* \* \* \* \*